(12) United States Patent
Payne

(10) Patent No.: US 6,461,025 B1
(45) Date of Patent: Oct. 8, 2002

(54) LAMP ASSEMBLY WITH SNAP FIT COMPONENTS

(75) Inventor: David G. Payne, Aloha, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 09/737,618

(22) Filed: Dec. 14, 2000

(51) Int. Cl.[7] ............................................. F21V 21/00
(52) U.S. Cl. .................... 362/374; 362/226; 362/362
(58) Field of Search ................................. 362/226, 396, 362/288, 372, 362, 364, 374

(56) References Cited

U.S. PATENT DOCUMENTS

| | | | | |
|---|---|---|---|---|
| 4,318,161 A | * | 3/1982 | Shanks | 362/226 |
| 4,318,162 A | * | 3/1982 | Sip | 362/226 |
| 4,320,439 A | * | 3/1982 | Wiley | 362/3 |
| 4,388,679 A | * | 6/1983 | Blaisdell et al. | 362/306 |
| 4,822,302 A | * | 4/1989 | Dorleans | 439/544 |
| 4,872,096 A | * | 10/1989 | Montet | 362/226 |
| 4,920,463 A | * | 4/1990 | Montet | 362/61 |
| 6,056,405 A | | 5/2000 | Heintz et al. | 353/85 |

\* cited by examiner

*Primary Examiner*—Alan Cariaso
*Assistant Examiner*—Sharon Payne
(74) *Attorney, Agent, or Firm*—Stoel Rives LLP

(57) ABSTRACT

A lamp module for an image projector includes a lamp assembly connected to a lamp frame by a retainer clip having three-point snap connection to the lamp frame. The retainer clip is made of sheet metal and includes a central opening that receives the lamp assembly to form a subassembly that snaps into the lamp frame. The lamp frame includes two upstanding posts each having a shoulder that snaps into an associated opening in the retainer clip. The retainer clip further includes a lip that snaps over the front face of the lamp frame to securely connect the lamp assembly to the lamp frame.

7 Claims, 4 Drawing Sheets

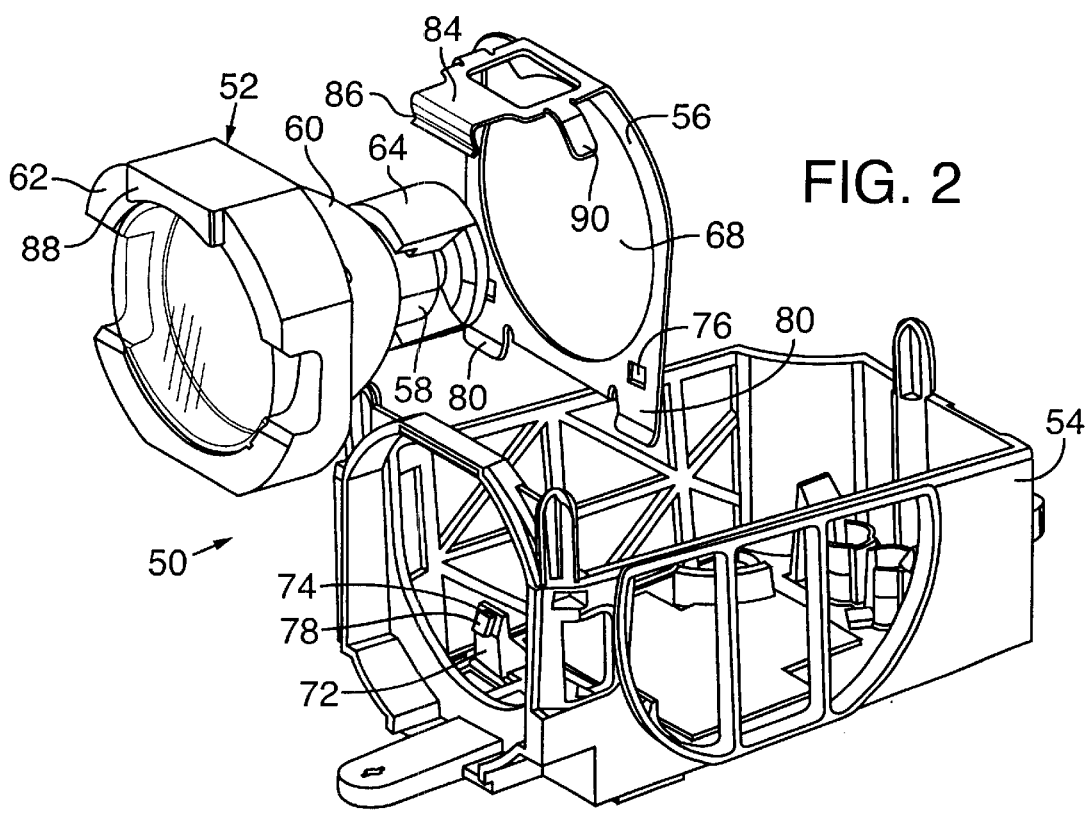
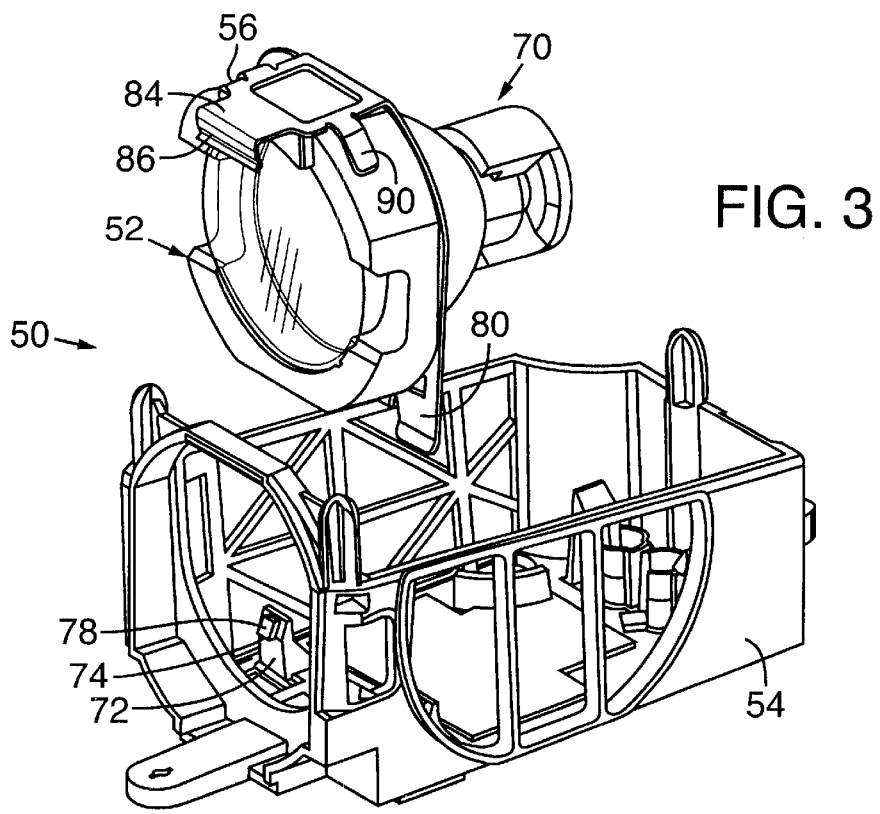

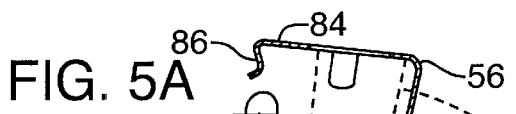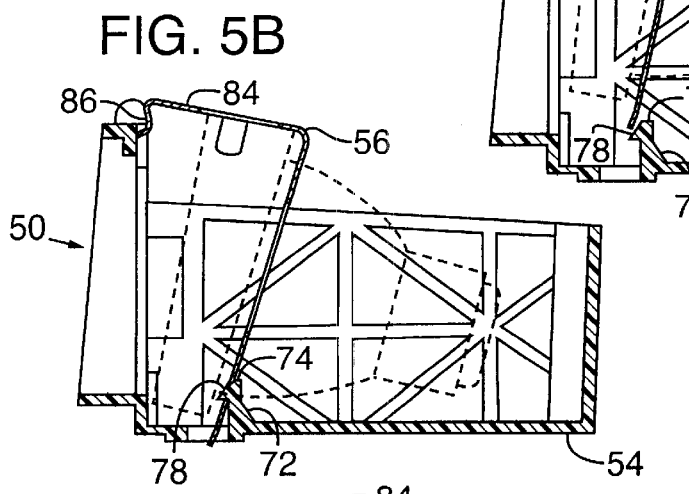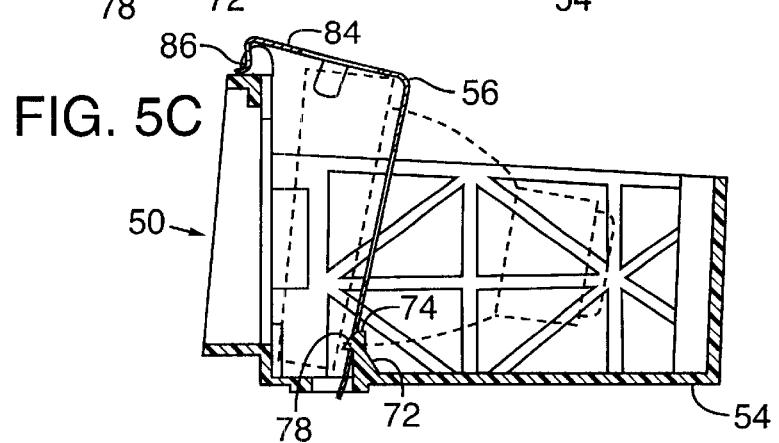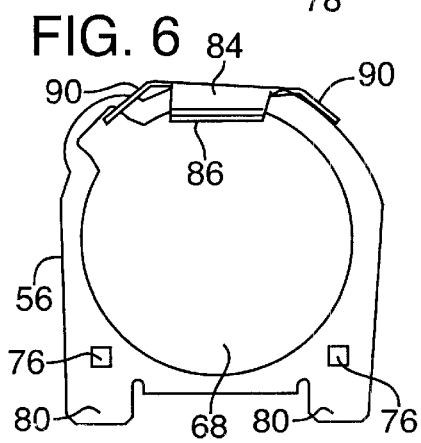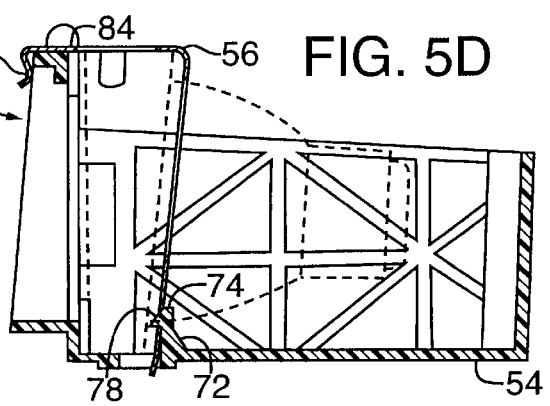

LAMP ASSEMBLY WITH SNAP FIT COMPONENTS

TECHNICAL FIELD

This invention relates to image projection devices and, more particularly, to a device for connecting a lamp assembly to a lamp assembly frame.

BACKGROUND OF THE INVENTION

Projection systems have been used for many years to project motion pictures and still photographs onto screens for viewing. More recently, multimedia projection systems have become popular for conducting sales demonstrations, business meetings, and classroom instruction.

In a common operating mode, multimedia projection systems receive analog video signals from a personal computer ("PC"). The video signals may represent still, partial-, or full-motion displays. A projection engine of these multimedia projection systems includes a light source, an image-forming device, and optical components for directing images onto a screen. Lamp modules include a lamp-reflector assembly having a concave reflector and a lamp or burner accurately mounted near the focal point of the concave reflector. Because lamps have limited life expectancy, lamp modules are designed to be replaced in the field by a user of the projection system.

Significant effort has been invested into developing projectors producing bright, high-quality color images. However, the optical performance of conventional projections is often less than satisfactory. For example, suitable projected image brightness is difficult to achieve, especially when using compact portable color projectors in a well-lighted room. The intensity of the light that can be generated by the lamp is one limitation of compact projectors. To maximize the intensity of light directed toward the image-forming device, an elliptical reflector is often used in the lamp-reflector assembly instead of a spherical or parabolic reflector. However, for optimal results, the reflectors must be accurately positioned relative to a light-path aperture of the projection engine within true position and parallelism tolerances of approximately (plus/minus) 0.002 inch (0.05 mm), making it impractical to adjust the position of the lamp-reflector assembly after it is installed in the projector.

Lamp modules in current projection systems are mounted by various devices such as one or a combination of brackets, plates, clips, and screws. For example, one prior art device includes a mounting bracket for a lamp-reflector assembly that has opposed channels sized to slide onto mounting rails located within a projector to precisely position the mounting bracket without the use of tools. The lamp-reflector assembly is securely held in place against an adjustment plate by a spring clip. The adjustment plate includes a key that fits into a groove on the lamp-reflector assembly to maintain the rotational position of the lamp-reflector assembly. Screws extend through oversized holes in the adjustment plate and are threaded into holes in the mounting bracket. The oversized holes allow the position of the adjustment plate to be adjusted during assembly. One problem that exists with this mounting system is that accurate positioning of the lamp-reflector assembly on the adjustment plate is difficult because the key and groove arrangement is formed in sheet metal. Additionally, this system is expensive to manufacture because it requires so many different elements, namely, the mounting bracket, adjustment plate, spring clip, and screws. All of these components are metal, adding to the cost and weight of the projector, which is undesirable in portable projection units.

SUMMARY OF THE INVENTION

An object of the present invention is, therefore, to provide a device for retention and accurate alignment of a lamp assembly in a lamp module assembly.

Another object of the present invention is to provide a single retention and alignment device that eliminates the need for multiple elements and supplemental parts.

Yet another object of the present invention is to provide a lamp retention and alignment device that is quick and easy to assemble without the need for tools.

An image projector includes a light source that directs light toward an image-forming device containing electronic and optical components for generating color images in response to an external data signal received by the image projector for projection onto a screen. The light source is a lamp module removably housed within the image projector. The lamp module includes a lamp assembly having a high intensity arc lamp mounted within a reflector. The lamp assembly is positioned and held within a lamp assembly frame by a retainer clip so that when the lamp module is located within the image projector light from the lamp assembly is accurately directed toward the image-forming device for projection onto a screen.

The retainer clip comprises a single piece of flexible sheet metal having a main body with a central opening to receive the lamp assembly and an extension portion that extends over the top of the lamp assembly and frame and snaps over the front face of the frame to secure it. The lamp assembly is further secured to the frame by a snap-in connection that includes upstanding posts on the frame with shoulders that snap into openings in the retainer clip. The retainer clip provides a simple yet secure three point attachment for connecting the lamp assembly to the frame so that the lamp module is accurately positioned to direct light along a light path toward the image-forming device and does not need to be adjusted.

Additional objects and advantages of this invention will be apparent from the following detailed description of preferred embodiments thereof which proceeds with reference to the accompanying drawings.

BRIEF DESCRIPTION OF THE DRAWINGS

FIG. 2 is an exploded perspective view of the lamp module of the present invention.

FIG. 3 is an exploded perspective view of the lamp assembly connected to the retainer clip.

FIGS. 5A–5D are sectional side views showing the installation of the retainer clip and lamp assembly to the frame.

FIG. 6 is a front view of the retainer clip.

DETAILED DESCRIPTION OF PREFERRED EMBODIMENT

Figure 1:
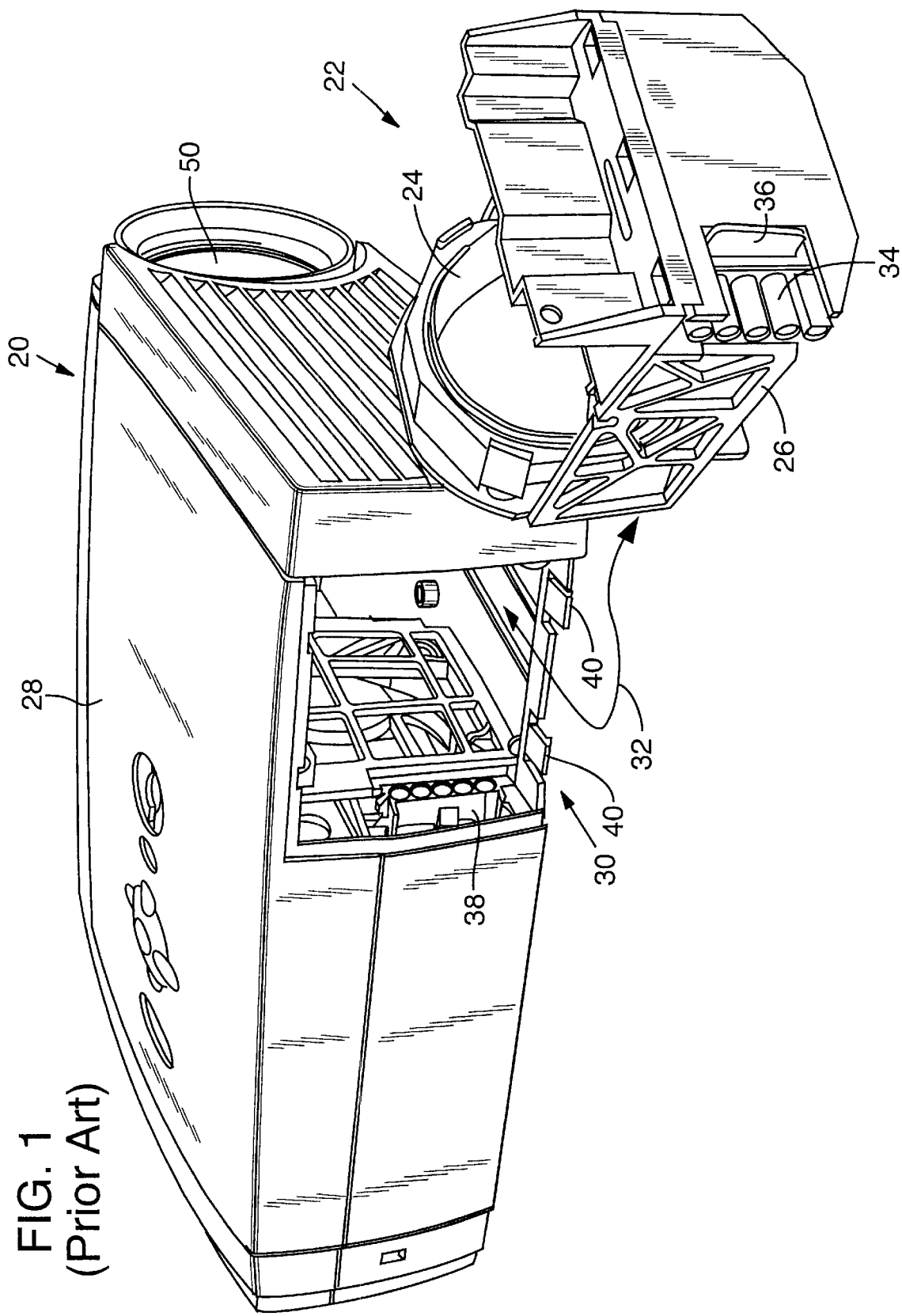
FIG. 1 is an exploded perspective view of a prior art image projector.

FIG. 1 shows a pictorial view of a prior art multimedia image projector 20 and a lamp module 22 which represent the type of device in which the present invention is used. The lamp module 22 includes a lamp assembly 24 supported within a plastic lamp frame 26. Image projector 20 includes a housing 28 having an access opening 30 through which lamp module 22 may be slidably inserted and removed along a path generally indicated by an arrow 32. A male electrical connector 34 is slidably mounted to lamp frame 26 and wired to lamp assembly 24. After a user inserts lamp module 22 fully within housing 28, the user pushes a tab 36 to slide male connector 34 into electrical connection with a female electrical connector 38 that is fixedly mounted within housing 28. Access opening 30 is then covered by an access panel (not shown) that snaps into place and is secured to housing 28 by a pair of latches 40. The lamp assembly 24 of this prior art device may be connected to the lamp frame 26 using a number of elements, such as, for example, one or a combination of brackets, plates, clips, springs, and screws.

Figure 4:
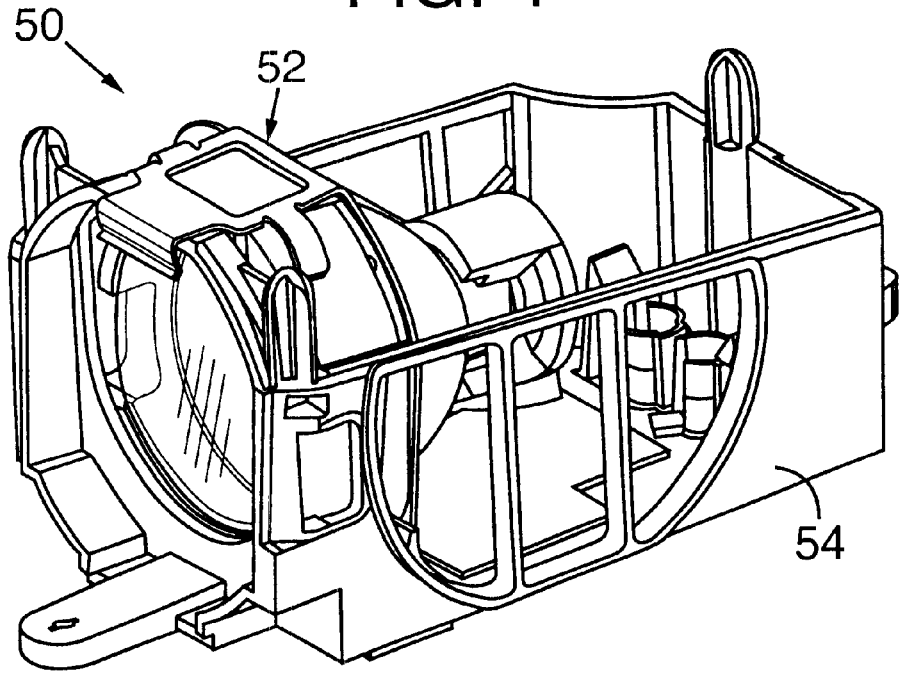
FIG. 4 is a perspective view of the lamp assembly secured within the frame by the retainer clip.

FIGS. 2–4 show a lamp module 50 in which a lamp assembly 52 is connected to a lamp frame 54 by a retainer clip 56 of the present invention. The lamp assembly 52 represents a typical lamp assembly and may include a light source 58 that is preferably a metal-halide arc lamp. However, other types of arc lamps, incandescent lamps, fluorescent lamps, burners, photo diode modules, and lasers may be used as the light source to provide adequate light intensity and quality. The light source 58 is positioned within a reflector 60 to reflect light toward an image forming device (not shown) in an image projector. A ceramic collar 62 is bonded to a front periphery of the reflector 60 and a ceramic end cap 64 is provided to bond the light source 58 and reflector 60 together. It is important that the lamp assembly 52 be accurately positioned so that no post-installation adjustments of the lamp assembly 52 are necessary to project the light toward the image forming device. Additionally, the lamp module 50 has a limited life span and must be easily replaceable.

The retainer clip 56 of the present invention provides a quick and easy snap-in connection to accurately position the lamp assembly 52 within the lamp frame 54 so that no further adjustments are necessary. The retainer clip 56 comprises a single piece of sheet metal with a central opening 68 adapted to receive the lamp assembly 52 seen most clearly in FIG. 3 to form a sub-assembly 70. The sub-assembly 70 is then snapped into the lamp frame 54 as seen in FIG. 4 where the retainer clip 56 is attached to the lamp frame 54 at a three point snap connection which will now be described.

The lamp frame 54 includes two upstanding posts 72 having shoulders 74 that are received in holes 76 in the retainer clip 56. Each shoulder 74 includes a ramp surface 78 for contacting spring feet 80 located on opposite sides of the retainer clip 56 during installation to force the lower portion of the retainer clip 56 toward the front of the lamp frame 54. As soon as the shoulders 74 align with holes 76 the retainer clip 56 snaps back so that the shoulders 74 are received in the holes 76. The retainer clip 56 includes an extension portion 84 having a lip 86 that snaps over the front face 88 of the ceramic collar 62 and the extension portion 84 includes side wings 90 that grip the ceramic collar 62.

To connect the lamp assembly 52 to the lamp frame 54 the retainer clip 56 is coupled with the lamp assembly 52 by positioning the lamp assembly 52 in the central opening 68 in the retainer clip 56 so that the extension portion It will be obvious to those having skill in the art that many changes may be made to the details of the above-described embodiment of this invention without departing from the underlying principles thereof. The scope of the present invention should, therefore, be determined only by the following claims.

What is claimed is:

1. A lamp module for a multimedia image projector, comprising:
   a lamp assembly having a light source positioned within a reflector;
   a lamp frame including a support wall having a surface from which one or more connecting posts extended, each connecting post including a shoulder; and
   a retainer clip having plural snap action connection points for connection to the lamp frame, at least one of the snap action connection points cooperating with the shoulder of an associated one of the connecting posts.

2. The lamp module of claim 1, in which the retainer clip comprises a body having a central opening to receive the lamp assembly to form a sub-assembly.

3. The lamp module of claim 1, wherein the lamp frame includes plural connection points that cooperate with the snap action connection points on the retainer clip to secure the lamp assembly to the lamp frame.

4. The lamp module of claim 1, wherein the lamp frame includes two connecting posts that extended from the surface of the support wall.

5. The lamp module of claim 1, wherein the support wall constitutes a first support wall and the lamp frame further comprises a second support wall that intersects the first support wall, the second support wall having an outer surface, and wherein the outer surface of the second support wall cooperates with at least one of the plural snap action connection points on the retainer clip.

6. The lamp module of claim 1, wherein the support wall constitutes a first support wall and the lamp frame further comprises a second support wall that intersects the first support wall, the second support wall having an outer surface, and wherein at least one of the plural snap action connection points on the retainer clip includes a lip that snaps over the outer surface of the second support wall of the lamp frame.

7. The lamp module of claim 1, wherein the snap action connection points of the retainer clip include at least one opening for cooperation with the shoulder of an associated one of the connecting posts.

* * * * *